UNITED STATES PATENT OFFICE.

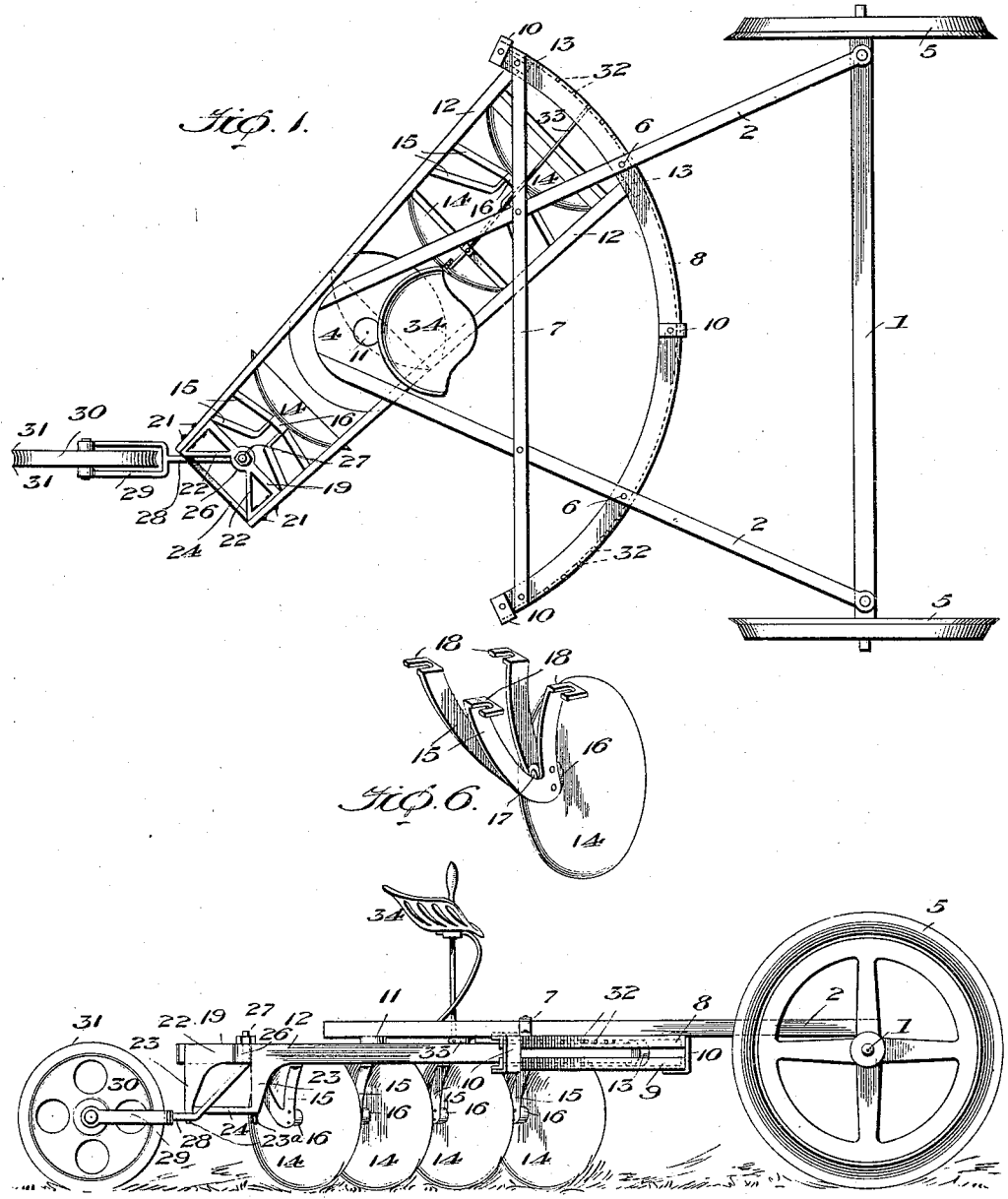

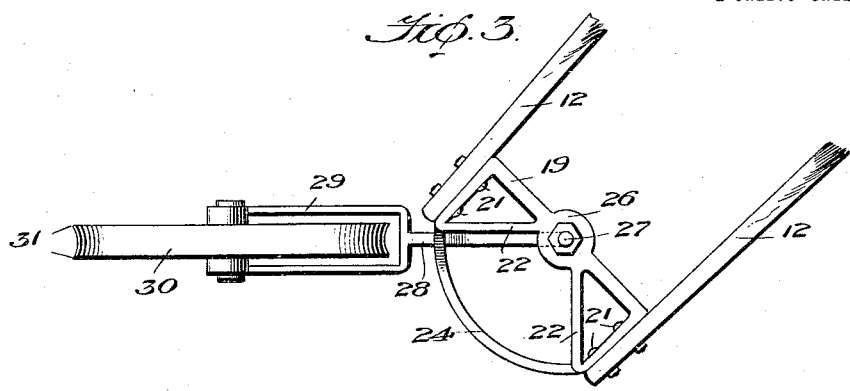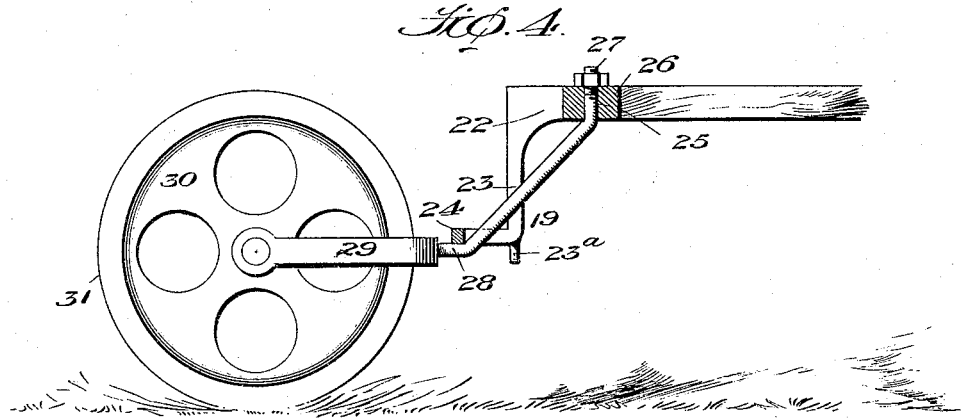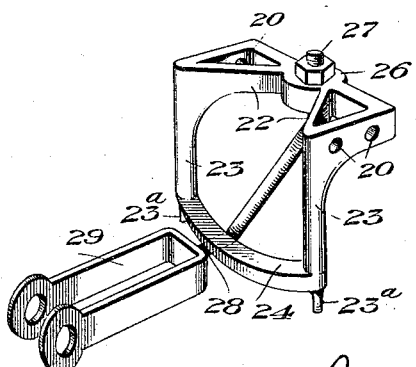

LEONARD BROWN, OF CAMBRIDGE, IDAHO.

REVERSIBLE GANG-PLOW.

1,149,720. Specification of Letters Patent. Patented Aug. 10, 1915.

Application filed August 10, 1914. Serial No. 856,053.

*To all whom it may concern:*

Be it known that I, LEONARD BROWN, a citizen of the United States, residing at Cambridge, county of Washington, and State of Idaho, have invented certain new and useful Improvements in Reversible Gang-Plows, of which the following is a specification.

This invention relates to reversible gang plows.

My object is to provide improvements on the reversible gang plow set forth in my copending application, Serial No. 762,300, filed April 19, 1913 in respect to the rear furrow wheel, the construction of the plow frame, and the relation of the plow frame to the main frame and to the rear furrow wheel.

In the present invention, I pivot the plow frame intermediate its ends to the main frame and mount it so that it can be swung laterally in relation to the main frame or the main frame swung laterally in relation to the plow frame when the plows are engaged with the earth, as for instance, when turning or plowing around land. I also swingingly or pivotally connect the rear furrow wheel to the rear part of the plow frame and provide improved means whereby the furrow wheel may have a limited swinging motion in relation to the said plow frame.

The present improvements simplify the construction set forth in my application, Serial No. 762,300, by entirely dispensing with the intermeshing gears and special mounting for the rear furrow wheel and the relationship and coöperation of the rear furrow wheel and plow frame is a swinging, idle one, instead of a positive shifting of the rear furrow wheel, and beside that, the rear furrow wheel is disposed on the opposite side of the pivot of the plow frame from the forward and greater length thereof, whereas in the plow of my application, Serial No. 762,300, it is located on the same side of the pivot of the plow frame as the major portion of that frame.

When the plow is turning a corner, as when plowing around land, for instance, the draft causes the idle furrow wheel to shift from one side to the other and when the plow frame is unlocked and the plows allowed to remain in the earth, the main frame is swung by the draft in relation to the plow frame and the furrow wheel then idly shifts to accommodate itself to the draft at all times. I preferably mount the plow disks so that they may be readily taken off and any desired kind of mold board plows substituted therefor.

As I am aware that the invention may be modified, the disclosure of the drawings and following description is to be considered as illustrative, rather than restrictive, of the scope of the invention.

In the accompanying drawings: Figure 1 is a plan view of the complete plow; Fig. 2, a side elevation; Fig. 3, a detail plan of the rear furrow wheel and its connection to the plow frame; Fig. 4, a side elevation thereof with certain parts of the stop casting in section; Fig. 5, a detail perspective of the stop casting and the yoke for the rear furrow wheel; and Fig. 6, a detail perspective of one of the disk plows and its standards.

As in the plow of my application, Serial No. 762,300, the main frame is composed of an axle 1, rearwardly converging frame pieces 2, and a plate 4 joining the rear parts of said frame pieces. The axle 1 and frame pieces 2 are preferably of I-beam construction, but are not limited thereto. The front steering wheels 5 are preferably provided with sharp flanges which are adapted to enter the earth and prevent slipping or skidding of the machine and also tend to cause it to resume its normal position if it is offset by a chunk of wood, rock, or a large root or other obstruction, striking the plow disks or mold-board. The manner of mounting the steering wheels 5 and of operating them by hand or by the draft, constitutes no part of the present invention and is set forth in my application, Serial No. 762,300. Any preferred means could be employed for such purposes, but I prefer to employ the construction set forth in my said application, although I do not limit myself thereto.

Suitably connected to the frame 2, as for instance, by any fastenings 6 and a lateral brace 7, is an arc-shaped track composed of upper and lower members 8 and 9 which are connected at intervals by clamps or hangers 10 to interbrace them and keep them in parallel relation to each other. This track lies in the arc of a circle struck from the pivotal connection 11 which joins the plow frame 12 to the plate 4 at the rear ends of the members 2.

The plow frame 12 consists of bars, preferably angle iron, which may be suitably cross-connected in any desired manner and are provided at their front ends with any suitable rollers or wheels 13 which are adapted to travel on the track composed of the members 8, 9, and to thereby support the front of the plow frame so that it is wholly mounted upon or suspended from the main frame 2, 2. The disk plows 14 may be connected to the frame members 12 in any desired manner, but preferably, they are arranged so as to be readily disconnected therefrom so that mold-board plows may be substituted therefor with rapidity and ease. To that end, I preferably provide the standard shown in Fig. 6, consisting of front and rear pairs of standards 15 secured to a boxing or mounting 16 in which is journaled the gudgeon or stub shaft 17 of the disk plow 14. At the upper ends of the standards 15 are laterally slotted feet 18, the slots of which are adapted to receive bolts connected to the frame members 12. On loosening the bolts, the standards 15 may be readily slipped off and other cultivating means, such as moldboard plows substituted therefor. The ready detachment of the disk plows 14 also adapts them for removal for sharpening at any time.

Secured to and located between the rear ends of the bars or beams 12, as shown in Figs. 1 and 3, is a casting 19 which is provided with suitable openings 20 (Fig. 5) for the passage of bolts 21 (Fig. 3) for fastening the casting to said beams 12. The casting is provided with upper parts 22 which are preferably arranged at ninety degrees distance apart. Depending from the upper part of the frame are the legs 23 having lower ends or stops 23ª which are connected by an arc-shaped track 24. An opening 25 extends through a hub 26 of the casting and in this opening is pivoted the upper end 27 of a swinging frame having a part 28 adapted to engage the under side of the track 24, thence extending rearwardly as a yoke 29 to which is journaled a rear furrow wheel 30 whose periphery is concaved to provide sharp peripheral edges 31 to engage the earth and assist in preventing slipping or skidding of the machine, as also to facilitate the shifting of the furrow wheel as hereinafter described. The weight of the rear part of the machine is partly borne by the track 24 and part 28.

Any desired number of openings 32 may be provided in the upper or lower part 8, 9, of the arc-shaped track. The plow frame carries any suitable releasable latch 33 having its rear part arranged for convenient manipulation by either the hand or the foot of the driver occupying the seat 34, and its forward end is adapted to engage the openings 32. Preferably, the latch is spring-actuated. By this means the plow frame 12 may be locked to the main frame at any desired angle in relation thereto, as in the machine of my application, Serial No. 762,300.

When the latch is released, the plow frame can be swung by hand in relation to the main frame, or, by allowing the cultivating disks or plows to remain in the earth, the main frame can be turned in relation to the plow frame, after which the plow frame may be again locked.

Assuming that the plow is advancing when arranged as in Fig. 1, and it is desired to change the draft to the opposite side as for instance, when turning around, the latch is released and the disks 14 allowed to remain in the earth, whereupon the team will turn the frame 2 in relation to the plow frame 12. When the draft changes, the yoke 29 of the furrow wheel 30 will swing so that it will engage the lower end 23ª of the other of the two stop bars or parts 23. When the plow frame is in its extreme shifted position to one or the other side of the main frame 2, the furrow wheel will be disposed substantially as in Figs. 1 and 3, but however it may be disposed, its lateral swing is limited to ninety degrees by parts 23ª and the same is true of the plow frame. At all times the furrow wheel will, by reason of its lateral swing being confined within certain limits in relation to the stop casting, always hold the plow straight and prevent it from pulling up or down hill.

Having thus described my invention, what I claim as new and desire to secure by Letters Patent, is:

1. In a wheeled reversible plow, the combination with a main frame and ground wheels therefor, of a reversible plow frame pivotally mounted on said main frame intermediate the ends of said plow frame and suspended by said main frame for lateral shifting in relation thereto, a laterally swinging frame pivotally and idly carried by the reversible plow frame rearwardly of the pivotal connection thereto to the main frame and adapted to shift laterally in relation thereto, and a furrow wheel carried by said swinging frame and supporting the rear of the main frame and plow frame.

2. In a wheeled reversible plow, the combination with a main frame and ground wheels therefor, of a reversible plow frame pivotally mounted on and suspended by said main frame, an idly mounted freely laterally swinging frame carried by the reversible plow frame, a furrow wheel carried by said swinging frame, and stops on the plow frame adapted to limit the swing or play of said last-named wheel in relation to said reversible plow frame.

3. In a wheeled reversible plow, the combination with a main frame and ground wheels therefor, of a reversible plow frame pivotally mounted on said main frame intermediate the ends of said plow frame and suspended by said main frame for lateral shifting in relation thereto, a laterally swinging frame pivotally and idly carried by the reversible plow frame rearwardly of the pivotal connection thereto to the main frame and adapted to shift laterally in relation thereto, a furrow wheel carried by said swinging frame, and stops on the rear end of the reversible plow frame adapted to limit the swing or play of the said last-named wheel in relation to said reversible plow frame.

4. In a wheeled reversible plow, the combination with a main frame, of a plow frame movable laterally in relation thereto, a stop frame carried by the movable plow frame and provided with a track and with stops, a trailing furrow wheel, and a swinging frame for said furrow wheel which is pivotally connected to the stop frame, is adapted to coöperate with the track thereof, and whose play in opposite directions is limited by the aforesaid stops.

In testimony whereof, I hereunto affix my signature in presence of two witnesses.

LEONARD BROWN.

Witnesses:
  DELTON L. CARTER,
  ELIZABETH NORTON.

Copies of this patent may be obtained for five cents each, by addressing the "Commissioner of Patents, Washington, D. C."